Nov. 15, 1966 LE ROY T. LONGTON 3,285,365
APPARATUS PARTICULARLY FOR USE IN HARVESTING HOPS
Filed Dec. 14, 1964 3 Sheets-Sheet 1

INVENTOR.
LE ROY T. LONGTON

BY B. P. Fishleum, Jr.
ATTORNEY.

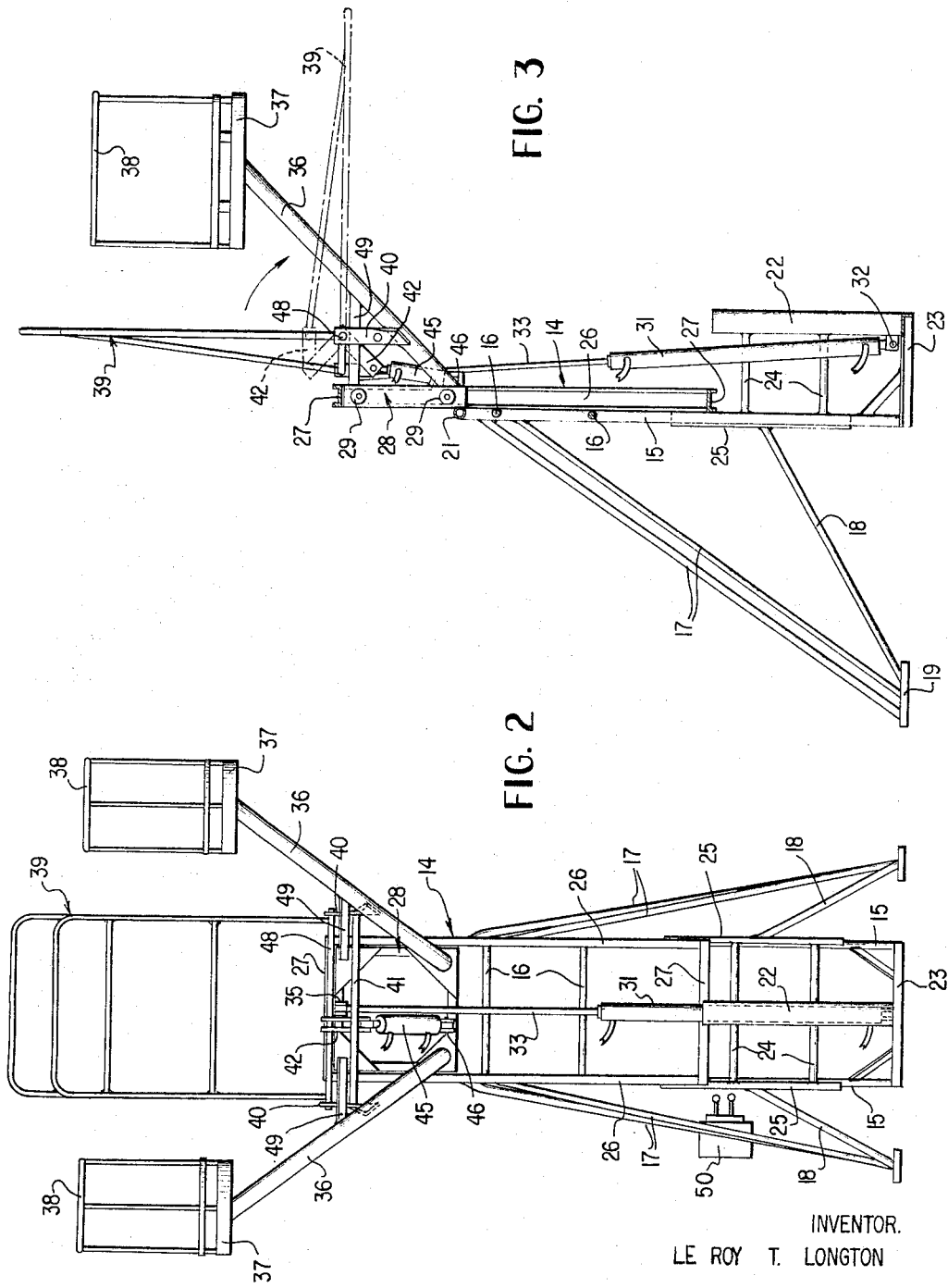

Nov. 15, 1966   LE ROY T. LONGTON   3,285,365
APPARATUS PARTICULARLY FOR USE IN HARVESTING HOPS
Filed Dec. 14, 1964   3 Sheets-Sheet 3
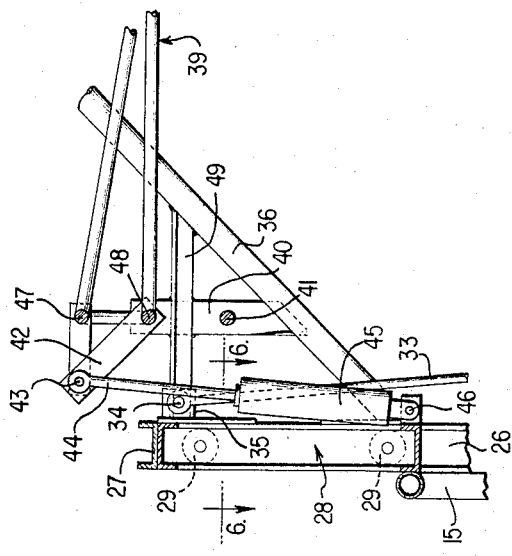
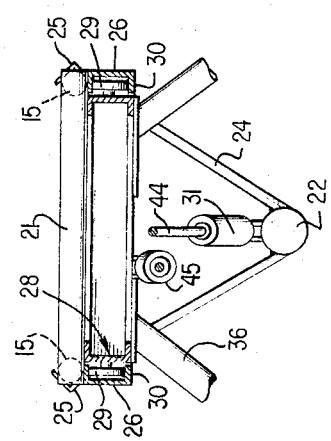
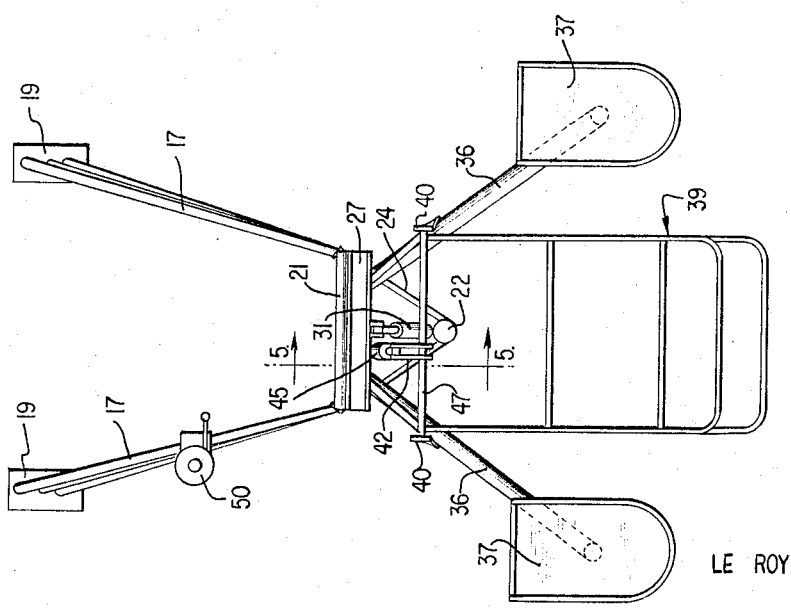
INVENTOR.
LE ROY T. LONGTON
BY
ATTORNEY.

United States Patent Office 3,285,365
Patented Nov. 15, 1966

3,285,365
APPARATUS PARTICULARLY FOR USE IN HARVESTING HOPS
Le Roy T. Longton, Yakima, Wash., assignor to Johnny Hester, Yakima, Wash.
Filed Dec. 14, 1964, Ser. No. 417,872
6 Claims. (Cl. 182—63)

This invention relates to an apparatus particularly for use in the harvesting of hop vines.

Conventionally, the harvesters of hops stand on a platform of fixed height behind a truck which may move slowly down the rows of hops in a field. The height of the overhead hop trellises varies considerably from field-to-field and may also vary within one field because of ground irregularities and variations in the length of the trellis poles upon which the overhead wires are supported. The result has been that the worker-supporting platform is frequently too high or too low with respect to the vines to be cut by the workers therefore making it difficult for the workers to reach the vines, and generally rendering the operation inefficient. Another problem is the necessity for packing the bulky hop vines in the harvesting truck. Conventionally, this has been done by the workers descending from the platform and walking around on the hop vines in the truck to pack or consolidate the vines. This is obviously an inefficient and time-wasting procedure.

It is the general object of this invention to provide a simplified mobile apparatus which will greatly increase the efficiency of the hops harvesting operation by the provision of worker supporting means which is quickly adjustable vertically and also the provision of an adjustable power-operated means for packing the vines down in the body or box of a truck or wagon.

Another object of the invention is to provide an apparatus of the above-mentioned character which is constructed as an attachment unit for a farm tractor and readily mountable thereon.

Another object is to provide a hop vine harvesting attachment for tractors which is hydraulically powered and operated from a hydraulic pump on the tractor and a simple control device in a convenient location to be used by the tractor driver.

Still another object is to provide an apparatus of the mentioned type which is rugged and durable, relatively lightweight, reliable and efficient in operation and economical to manufacture.

Other objects and advantages of the invention will be apparent during the course of the following detailed description.

In the accompanying drawings forming a part of this application and in which like numerals are employed to designate like parts throughout the same, FIGURE 1 is a side elevation of an apparatus employed in the harvesting of hop vines and illustrating the same during use;

FIGURE 2 is an enlarged front elevation of the apparatus removed from the tractor;

FIGURE 3 is a side elevational view of the apparatus, partly in section;

FIGURE 4 is a plan view of the apparatus;

FIGURE 5 is an enlarged fragmentary vertical section taken on line 5—5 of FIGURE 4; and FIGURE 6 is a horizontal section taken on line 6—6 of FIGURE 5.

Figure 1:
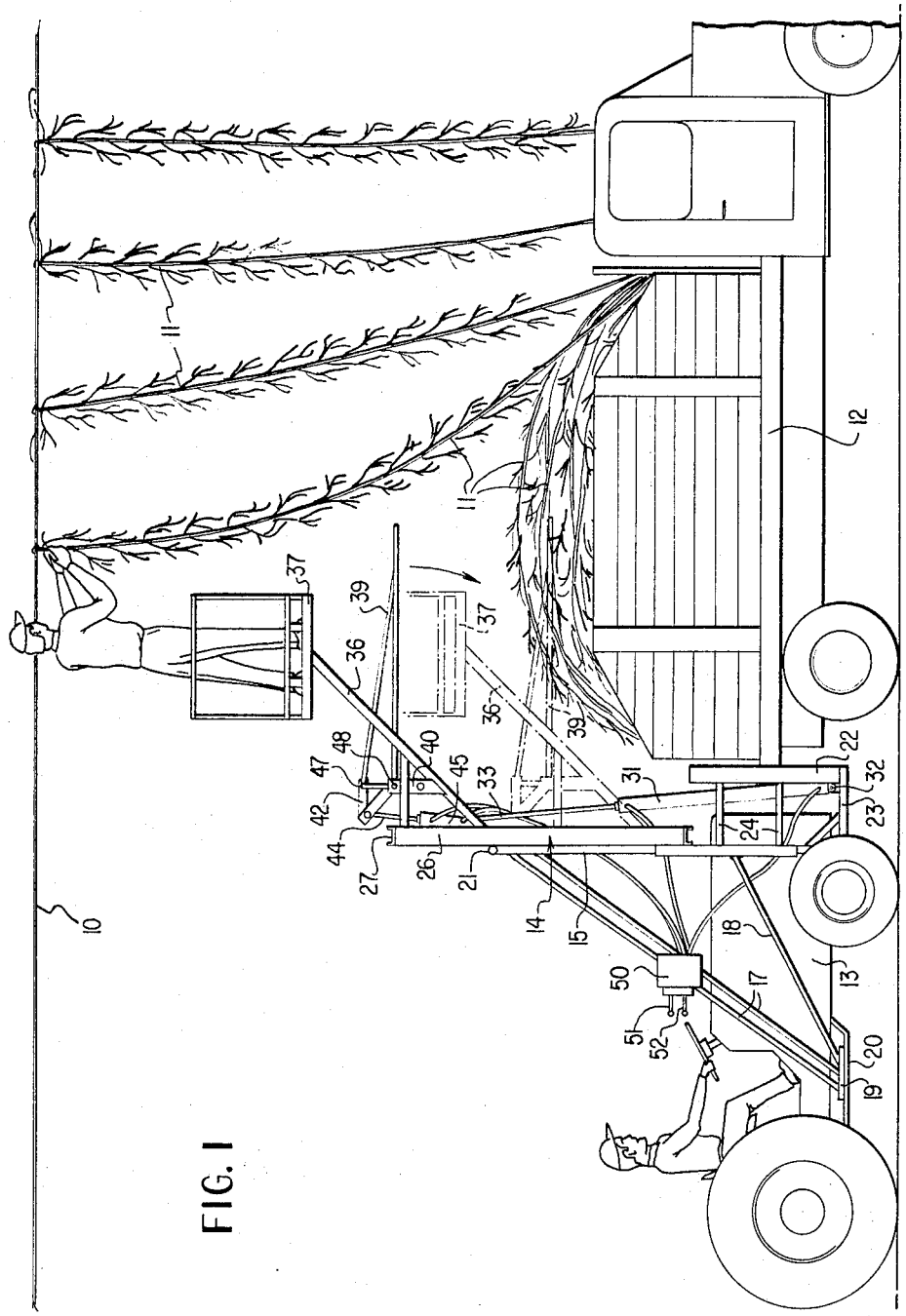

In the drawings, wherein for the purpose of illustration is shown a preferred embodiment of the invention, attention being directed first to FIGURE 1, the numeral 10 designates an overhead trellis wire upon which a multiplicity of hop vines 11 grow and have their upper end portions encircled about the same. The vines 11 hang from each wire 10 and of course have their lower ends rooted in the ground but such lower ends have been severed at the beginning of the harvesting operation, whereby the vines remain hanging from the trellis wires. A number of spaced parallel wires support rows of the vines, and the purpose of the apparatus herein is to travel down between pairs of the trellis wires 10, enabling a pair of workers on the apparatus to cut the tops of the vines 11 close to the wires and allow them to drop into a truck or wagon 12 which may be pushed along the rows by a conventional farm tractor 13 on which the apparatus shown generally at 14 in FIGURE 1 is mounted. As will be described, the apparatus 14 is fully adjustable as to height and has means for packing and consolidating the bulky vines in the body of the truck or wagon without damaging the hop cones.

The apparatus 14, FIGURES 2 and 3, comprises a supporting frame including a pair of spaced vertical frame bars 15, preferably having a pair of spaced cross braces 16 rigid therewith. The upright frame is given stability by long and short inclined braces 17 and 18 whose forward ends are secured rigidly by welding or the like to the vertical frame bars 15 and whose rear ends are welded to sturdy horizontal feet 19 which are securely bracketed to the tractor 13 as shown at 20 in FIGURE 1 on opposite sides of the tractor. The tops of the bars 15 are further rigidly interconnected by another horizontal cross bar 21.

Mounted forwardly of the frame bars 15 and midway between the same is a sturdy vertical post or bumper element 22 adapted to engage the truck 12, FIGURE 1, for pushing it. The post 22 is supported upon a forwardly projecting horizontal frame extension 23 rigid with the bottoms of the bars 15. The post 22 is braced by a plurality of rearwardly extending diverging braces 24 rigid therewith and having their rear ends welded to the vertical bars 15. Reinforcing angle bars 25 may also be welded to the bars 15 to further strengthen them at the regions where they are subject to the greatest strain. The parts thus far described constitute a unitary rigid frame which can be attached bodily to the tractor 13 and can be demounted therefrom when required. The frame extension 23 is suitably anchored or bracketed to the tractor main frame and the bumper or pusher post 22 is disposed slightly forwardly of the tractor engine, as shown. The several braces 17 and 18 and the vertical bars 15 straddle the tractor, as indicated.

Also rigidly secured by welding or the like to the forward faces of vertical bars 15 is a vertical guide or track device composed of a pair of channel bars 26 having their upper and lower ends rigidly interconnected by transverse horizontal channel members 27. Connected elements 26 and 27 form a rigid rectangular structure on the forward sides of the bars 15 and the channel bars 26 of this structure constitute vertical tracks for a smaller rectangular vertical carriage 28 which bodily carries the worker-supporting platforms and the vine packing means to be described. The guide tracks 26 extend somewhat above the tops of the vertical bars 15. The carriage 28 as shown clearly in the drawings is much shorter than the channel bars or tracks 26 and is adapted to move vertically thereon for a considerable distance limited only by the lengths of the channel bars 26. In the several views of the drawings, the vertically shiftable carriage 28 is shown at the upper limit of its travel close to the upper cross bar 27 as would be the case when harvesting hops growing on wires 10 at the maximum height.

The carriage 28 is provided upon opposite sides thereof with pairs of vertically spaced rollers 29 which are guided by the flanges 30, FIGURE 6, of channel bars 26. The carriage 28 is raised and lowered by a generally vertical, although slightly inclined, hydraulic cylinder 31 having its lower end pivotally secured at 32 to frame extension 23, immediately rearwardly of the post 22. The cylinder 31 has an extensible and retractable piston rod 33 whose upper end is pivotally secured at 34 to a block 35 or the like on the top and forward side of the carriage 28. When the piston rod 33 is fully retracted, the carriage 28 can descend to the lower cross bar 27.

Projecting forwardly, upwardly and laterally outwardly from the lower corners of the carriage 28 are a pair of sturdy inclined support arms 36 having horizontal individual worker supporting platforms 37 rigidly attached to their upper ends. As shown, the platforms 37 project forwardly of the main supporting frame and laterally upon opposite sides thereof, FIGURES 2 and 3. When the carriage 28 is fully elevated, the platforms 37 are considerably above the top of the cross bar 27 so that workers may reach trellis wires 10 of the maximum height expected to be encountered. The lower ends of the arms 36 are rigidly secured to the carriage 28 by welding or the like. The platforms 37 are preferably equipped with suitable safety railings 38.

Between the spaced platforms 37 and at an elevation somewhat therebelow and near the top of the carriage 28, a vertically swingable vine packing or compressing frame or member 39 has its rear end pivoted between a pair of rigid upright members 40 which rise from the arms 36 and are welded thereto. The members 40 are preferably cross braced as at 41. The vertically swingable vine compressing frame 39 is operated by a bell crank 42 connected to the rear thereof near the transverse center of the frame, said bell crank being pivotally connected at 43 to an extensible and retractable piston rod 44 of a hydraulic cylinder 45 having its lower end pivotally secured at 46 to the bottom and forward side of the carriage 28. The cylinder 45 is thus bodily mounted on the carriage 28 and moves therewith. The cylinder 45 lies close to the carriage and between the support arms 36 and slightly to one side of the piston rod 33 so as to make a very compact arrangement. The bell crank 42 as shown clearly in FIGURES 3 and 5 has two points of connection with transverse bars 47 and 48 of the frame 39, and when the piston rod 44 is extended and retracted by the piston within the cylinder 45, the bell crank turns upon the axis of the bar 48 and swings the frame 39 vertically upwardly or downwardly toward either the vertical position shown in full lines in FIGURE 3 or the horizontal position shown in broken lines therein.

The support arms 36 are further rigidly interconnected with the carriage 28 by braces 49. The pivotal connection of the frame 39 with the members 40 is through the transverse bar 48 as clearly shown in the drawings.

The operation of the two hydraulic cylinders 31 and 45 is effected from the driver's seat of the tractor 13 by a simple conventional control valve unit 50, whose construction and operation need not be dealt with in detail herein. Suffice it to say that the unit 50 has two manually operated levers 51 and 52 whose operation controls the flow of fluid under pressure to and from the cylinders 31 and 45. The upper and lower ends of these cylinders are connected in a conventional way with hydraulic lines leading to the unit 50, as shown in the drawings. The two cylinders 31 and 45 may be operated by the driver of the tractor independently by manipulating the levers 51 and 52, one of which is for each cylinder. The extensible piston rods 33 and 46 are thus independently controllable by the driver of the tractor to raise and lower the carriage 28 and position the carriage fixedly at the desired elevation. This is done by placing the levers 51 and 52 in a neutral position. The piston rod 44 may be caused to reciprocate by oscillating the proper control lever and this in turn will impart the desired swinging motion to the vine compressing rack 39.

The general operation of the apparatus is as follows:
The tractor 23 pushes the truck 12 slowly along and between two rows of vines which have already been cut close to the ground and are suspended from the trellis wires 10. The worker platforms 37 on the carriage 28 are positioned at the desired elevation by manipulating the proper control lever of the unit 50. Initially, the frame 39 is disposed vertically as shown in full lines in FIGURE 3.

As the vines 11 are cut from the wires 10, they will fall into the truck 12 as shown in FIGURE 1. The vines are very bulky and therefore occasionally must be packed or compressed downwardly in the truck body. In order to accomplish this, the carriage 28 is lowered by the operator of the tractor and the rack 39 is also swung toward the horizontal position shown in FIGURE 1 and also in broken lines in FIGURE 3. Sufficient lowering of the carriage 28 will cause the horizontal compressing frame or rack 39 to engage and pack down the vines 11 firmly in the truck body. As stated previously, oscillation may be imparted to the rack or frame 39 as desired. The frame 39 may be caused to swing somewhat below the horizontal position shown in FIGURE 1 if preferred. The length of the stroke of piston rod 44 limits the degree of movement of the frame 39 on its pivot 48. The platforms 37 and the rack or frame 39 move as a unit with the single carriage 28 and may therefore be arranged at various elevations to accommodate trellis wires of varying heights.

In view of the above description, it is thought that the various features of the invention will be readily appreciated by those skilled in the art without a further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. An apparatus for use in harvesting hops and the like comprising a frame attachable to a tractor and projecting thereabove, a substantially vertical track means on said frame extending to a considerable elevation above the tractor, a carriage on the track means to move lengthwise thereof, power means controlled from the tractor and connected with the carriage to raise and lower the carriage, a pair of laterally spaced worker supports on the carriage and projecting thereabove, and a packer device on the carriage between the worker supports for packing harvested hops down in a truck or the like in advance of the tractor when the carriage is lowered.

2. The invention as defined by claim 1, and means forming a pivotal connection between the packer device and carriage, whereby the packer device may be swung vertically between generally upright and generally horizontal positions, and power means controlled from the tractor and connected with the packer device to swing the same vertically and releasably hold the packer device in a selected adjusted position.

3. An apparatus for use in harvesting hop vines which hang from overhead trellis wires comprising a motor vehicle, a supporting frame on the motor vehicle including a substantially vertical track means extending above the vehicle, a carriage engaging the track means and movable upwardly and downwardly thereon, power means controlled from the vehicle and connected with the carriage to raise and lower the same, a worker supporting platform secured to the carriage to move therewith and adapted to position the worker close to said vines, a vine packing rack pivoted to the carriage and being vertically swingable and adapted in one position to project substantially vertically above the carriage and in another position to project substantially horizontally forwardly of the carriage and vehicle, and separate power means controlled from the vehicle and connected with said rack to control the movement thereof upon the carriage.

4. The invention as defined by claim 3, and wherein the first-named and separate power means comprise a pair of independently operable fluid pressure powered extensible and retractable devices connected respectively with the carriage and said rack, and control valve means on said vehicle within reach of the driver of the vehicle and operatively connected with said devices.

5. The invention as defined by claim 4, and a pusher extension on said supporting frame and spaced forwardly of the vertical track means and power means and adapted to engage and push a truck or the like ahead of said vehicle, whereby harvested vines may be dropped directly into the truck by said worker.

6. A hops harvesting attachment for farm tractors comprising a frame adapted to be rigidly secured to the tractor, vertical track means on said frame extending substantially above the tractor, said frame including a pusher part in advance of the track means, carriage means on the track means, fluid pressure operated means controlled from the tractor and connected with the carriage means to raise and lower the same, a pair of forwardly and upwardly projecting and laterally spaced separate worker platforms secured to the carriage means to move bodily therewith, a harvested hops compacting device pivotally connected with the carriage means between said platforms and being vertically swingable and adapted to be substantially vertically or substantially horizontally disposed, and independent fluid pressure operated means on the carriage and connected with the compacting device to control the movement thereof and controlled from the tractor.

References Cited by the Examiner

UNITED STATES PATENTS

| 2,672,377 | 3/1954 | Werner | 182—2 |
| 2,969,849 | 1/1961 | Grant | 182—2 |
| 2,989,140 | 6/1961 | Hill | 182—63 |

REINALDO P. MACHADO, *Primary Examiner.*